United States Patent
Valliani et al.

(10) Patent No.: US 6,311,063 B1
(45) Date of Patent: *Oct. 30, 2001

(54) METHOD OF AND SYSTEM FOR EMULATION OF MULTIPLE SUBSCRIBER PROFILES ON A SINGLE MOBILE PHONE IN A WIRELESS TELECOMMUNICATIONS NETWORK

(75) Inventors: Farrukh Valliani, Irving; Steven Robert Donovan, Plano, both of TX (US)

(73) Assignee: MCI Communications Corporation, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/987,934

(22) Filed: Dec. 10, 1997

(51) Int. Cl.[7] .................................................. H04Q 7/38
(52) U.S. Cl. ..................... 455/433; 455/435; 455/461; 455/414; 455/551
(58) Field of Search .................................. 455/432, 433, 455/435, 414, 419, 420, 461, 551, 552, 466, 564, 410, 411, 403, 415, 417, 418, 550, 565; 379/201, 219, 220, 229, 230

(56) References Cited

U.S. PATENT DOCUMENTS

| | | | | |
|---|---|---|---|---|
| 4,677,653 | * | 6/1987 | Weiner et al. | 455/551 |
| 5,437,053 | * | 7/1995 | Sawa et al. | 455/551 |
| 5,448,622 | * | 9/1995 | Huttunen | 455/551 |
| 5,764,730 | * | 6/1998 | Rabe et al. | 455/415 |
| 5,839,067 | * | 11/1998 | Jonsson | 455/418 |
| 5,903,832 | * | 5/1999 | Seppanen et al. | 455/414 |
| 5,915,220 | * | 6/1999 | Chelliah | 455/433 |
| 5,960,365 | * | 9/1999 | Leih et al. | 455/552 |
| 5,983,095 | * | 11/1999 | Cameron | 455/414 |

FOREIGN PATENT DOCUMENTS

92/19078 * 10/1992 (WO).

* cited by examiner

Primary Examiner—Vivian Chang
Assistant Examiner—Lester Kincaid

(57) ABSTRACT

A method of and system for emulation of multiple subscriber profiles on a single telephone in a telecommunications network. An identified group contains more than one subscriber profile. The system is activated when a user selects a subscriber profile to be associated with the telephone being used. In response to the selection, the system determines whether the selected subscriber profile is within the group. If it is, the system associates the selected subscriber profile from the group with the telephone, such that the telephone emulates the selected subscriber profile. If the selected subscriber profile is not within the group, the subscriber profile associated with the telephone is unchanged.

41 Claims, 2 Drawing Sheets

METHOD OF AND SYSTEM FOR EMULATION OF MULTIPLE SUBSCRIBER PROFILES ON A SINGLE MOBILE PHONE IN A WIRELESS TELECOMMUNICATIONS NETWORK

FIELD OF THE INVENTION

The present invention relates generally to subscriber registration of mobile phone features in a wireless telecommunications network, and more particularly to a method and system for allowing multiple emulation of subscriber profiles on a single mobile phone in a wireless telecommunications network.

DESCRIPTION OF THE PRIOR ART

Wireless communications systems currently maintain mobile phone subscriber profiles at a home location register ("HLR"). Although a subscriber may change his or her profile, it cannot be done dynamically. As a result, each member of a family or work group, who has a mobile phone, must carry their mobile phones with them even when they travel with other members of the family or work group that also have mobile phones. Although the traveling members could forward their calls to one specific mobile phone, and as a result their calls will be transferred to that mobile phone, the subscriber profile of that mobile phone remains unchanged.

Currently, there is no system by which a single mobile phone can be programmed to emulate the subscriber profile of another mobile phone. It is, therefore, an object of the present invention to provide a method and a system for allowing a single mobile phone to emulate multiple subscriber profiles in a wireless telecommunications network.

SUMMARY OF THE INVENTION

The present invention provides a method and a system of allowing a single mobile phone to emulate the subscriber profile—set of features ("SOF"), such as call waiting, call forwarding, three-way calling, conference calling, voice mail service, etc.—of multiple mobile phone users. Each mobile phone is assigned an individual and unique mobile identification number ("MIN"). This mobile identification number is used in communications (IS-41 protocol) between the mobile phone, the mobile switching center ("MSC"), the visiting location register ("VLR"), and the home location register ("HLR") to identify the mobile phone with a specific telephone number and a set of features stored within a subscriber profile. This mobile identification number also allows the wireless communications network to keep track of the location of the mobile phone. Although multiple mobile phones may have a single telephone number, each phone has a unique mobile identification number.

The set of features associated with a specific mobile identification number is stored in the home location register subscriber profile. Under the present invention, a group of mobile phones may be identified within a specific caller group. For example, Group A may contain mobile phones MIN-1, MIN-2, MIN-3, and MIN-4. Each one of these mobile phones is assigned a predefined invoke command <key-1>, <key-2>, <key-3>, and <key-4>. In addition, each of these mobile phones is assigned a specific set of features SOF-1, SOF-2, SOF-3, and SOF-4 respectively. A pass code may also be assigned to each predefined invoke command, such that only authorized users may assign the set of features to a mobile phone in Group A. By identifying these mobile phones or mobile identification numbers with a predefined invoke signal within the predefined Group A, the invention allows each mobile phone in Group A to emulate the set of features assigned to any other mobile phone in Group A. Alternatively, Group A may include different subscriber profiles that can be activated for a single mobile phone, e.g., a husband and wife share a single mobile phone, but want to use different subscriber profiles.

If a user of the mobile phone designated MIN-1 wants to have that phone emulate the subscriber functions or set of features associated with another mobile phone within the Group A, such as MIN-2, the user would press a predefined function key <key-2> to initiate this process. The user may also enter a password, if one is required. The function key <key-2> transmits an invoke <key-2> command to the serving MSC-VLR which in turn transmits the invoke <key-2> command to the HLR. In response to the invoke <key-2> command, the HLR retrieves the group associated with MIN-1, Group A, and determines whether a MIN and SOF are associated with the invoke <key-2> command in Group A. In other words, the HLR determines whether MIN-1 and MIN-2 are in the same group, Group A. If they are not in the same group as MIN-1, the HLR transmits a return error or reject message to the serving MSC/VLR, which in turn transmits that result to the mobile phone, which notifies the user that the invoke <key-2> command failed.

If on the other hand, the MIN associated with the function key <key-2>, MIN-2, is in the same group as MIN-1, the HLR determines whether a pass code is associated with <key-2> in Group A. If a pass code is found, the HLR determines whether a password was transmitted with the invoke <key-2> command. If a password was not transmitted, the HLR transmits a password request to the serving MSC/VLR, which in turn transmits that request to the mobile phone. The user is then prompted for a password. The mobile phone then transmits the password to the serving MSC/VLR, which in turn transmits the password to the HLR. When the HLR receives the password or if the password was originally transmitted with the invoke <key-2> command, the HLR determines whether the transmitted password matches the pass code associated with <key-2>. If they do not match, the HLR transmits a return error or reject message to the serving MSC/VLR, which in turn transmits that result to the mobile phone, which notifies the user that the invoke <key-2> command failed.

If the transmitted password matches the pass code associated with <key-2> or a pass code was not associated with <key-2> in Group A, the HLR retrieves the set of features for the MIN associated with the function key <key-2>, SOF-2, and associates those set of features with MIN-1. This effectively disables the set of features normally associated with MIN-1, SOF-1, so that MIN-1 now emulates the set of features for MIN-2, SOF-2. The HLR then transmits a return result, which contains the subscriber profile associated with the set of features for MIN-2, to the serving MSC/VLR, which in turn transmits that result to the mobile phone, which notifies the user that the invoke <key-2> command was successful.

Alternatively, this process could be initiated by voice command activation rather than a function key. In addition, upon a proper request by the user, this process could be initiated by the customer service department of the mobile phone service provider.

Once MIN-1 has been associated with a set of features for MIN-2, SOF-2, MIN-1 will ring when the telephone number for MIN-2 is dialed. Moreover, MIN-1 will now completely emulate MIN-2 such that the user would not know the difference. The invention can be configured such that when MIN-1 is assigned the set of features for MIN-2, SOF-2, MIN-1 will ring when the telephone numbers assigned to MIN-1 or MIN-2 are dialed.

If the members of a family or work group share one or more common mobile phones in addition to each member having one or more phones outside the family or work group, they may identify all these phones within a group such that any member may cause one of the mobile phones to emulate the set of features assigned to any of the other mobile phones. By way of illustration, if the members of the family or the group were planning to take a trip, and they only wanted to take one mobile phone, they could use the present invention to allow each member of the group to emulate the set of features of their normal mobile phone on a single mobile phone. This eliminates the necessity of carrying everyone's mobile phone on the trip. While on the trip, the mobile phone MIN-1 would normally be associated with its standard set of features SOF-1. At any time, one of the members of the group could press a preassigned function key and enter a password, if one is required, and change the emulation of the mobile phone MIN-1 from SOF-1 to any of the set of features within the group, such as SOF-2, SOF-3, or SOF-4. The present invention allows any one of the members of a group to carry the phone and assign their individual set of features to that phone, which is particularly useful when an important call is expected, or they need to use the specific set of features assigned to their mobile phone.

DESCRIPTION OF THE PREFERRED EMBODIMENT

Figure 1:
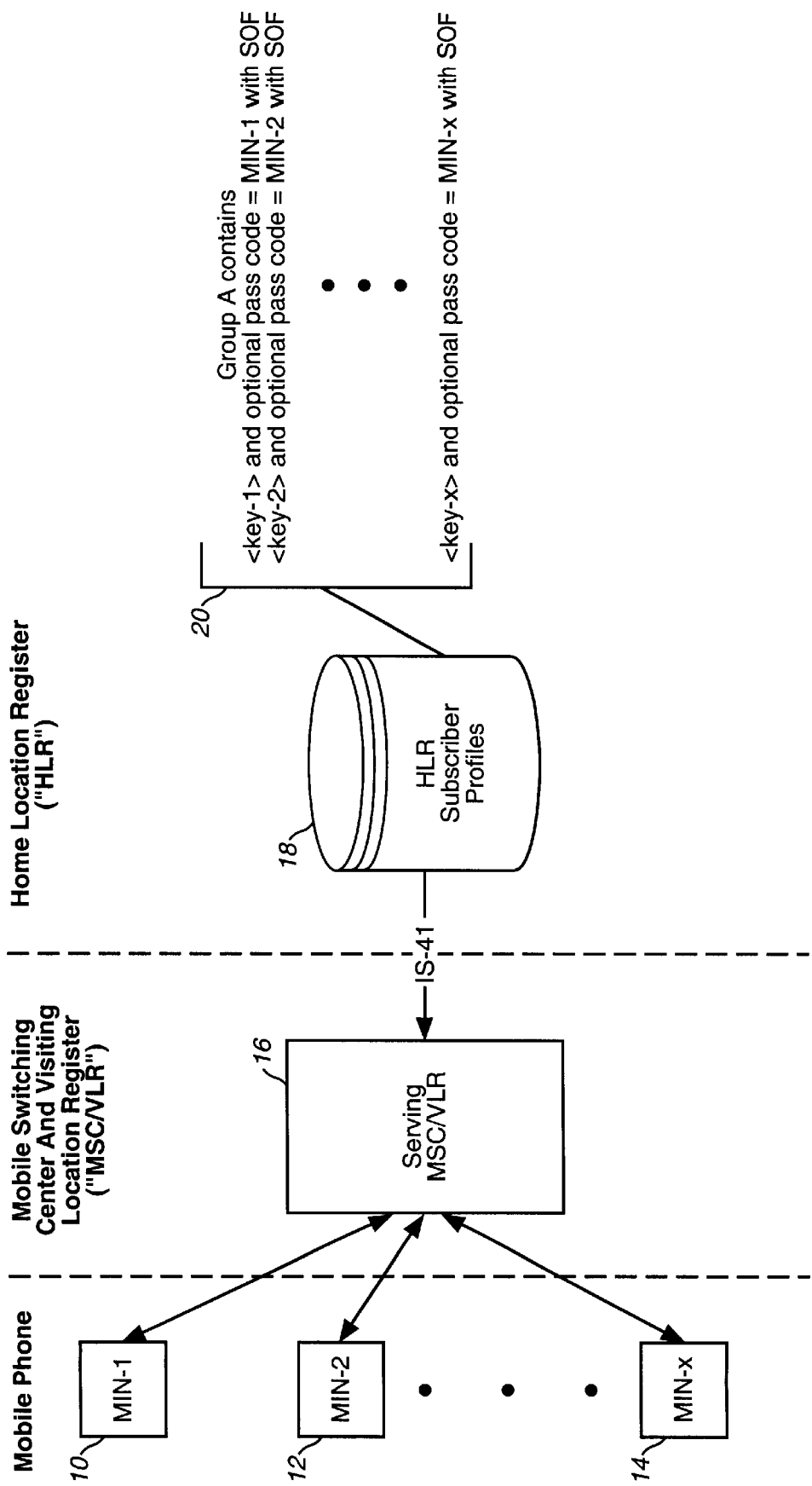
FIG. 1 is a block diagram illustrating the physical relationship of the components of the present invention.

Referring now to the Drawings, and first to FIG. 1, a wireless communications network is illustrated. Mobile telephones, each with an individual mobile identification number ("MIN"), are designated by MIN-1 10, MIN-2 12, and MIN-x 14. These mobile phones 10, 12, 14 communicate with a mobile switching center and are registered in a visiting location register ("MSC/VLR") 16 using the IS-41 protocol. The MSC/VLR 16 communicates with the mobile phones' 10, 12, 14 home location register ("HLR") 18 using the IS-41 protocol. The HLR 18 contains a subscriber profile or a set of features ("SOF") for each of the mobile phones 10, 12, 14 and contains a file identifying Group A 20. The file identifying Group A 20 associates a predefined function key on the mobile phone to a specific MIN with SOF, <key-1>=MIN-1 with SOF-1, <key-2>=MIN-2 with SOF-2, and <key-x>=MIN-x with SOF-x. The file identifying Group A 20 may also contain a pass code, which is associated with each predefined function key. Any number of phones can be listed in a specified group. Alternatively, Group A 20 may include different subscriber profiles that can be activated for a single mobile phone, e.g., a husband and wife share a single mobile phone, but want to use different subscriber profiles.

Figure 2:
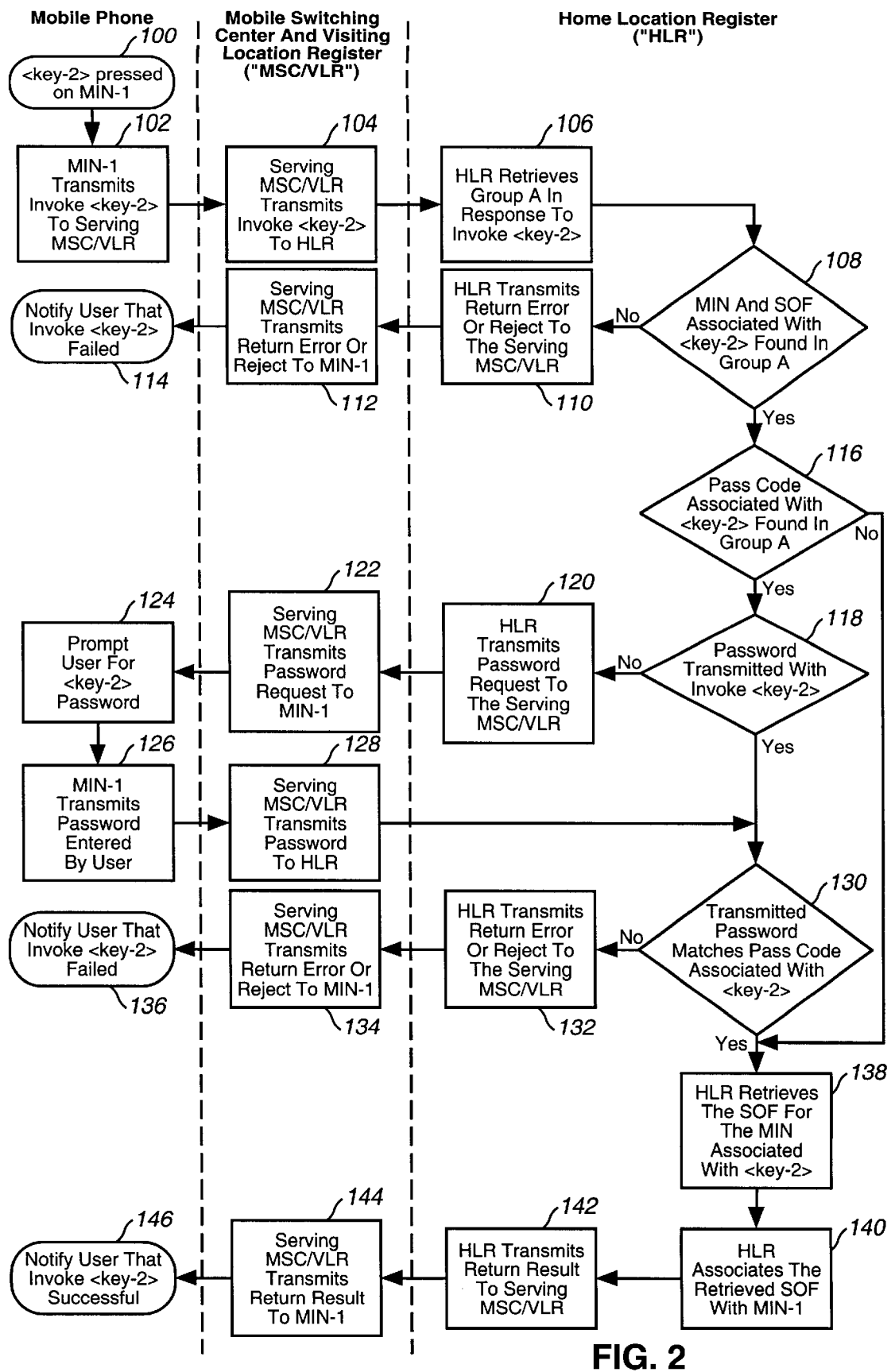
FIG. 2 comprises a flow chart of a preferred implementation of the present invention.

Now referring both to FIGS. 1 and 2, the flow chart of the present invention will be described in relation to the wireless communication network. The present invention is activated when the user selects a subscriber profile for the mobile phone to emulate. Typically, the user selects the subscriber profile by pressing a predefined function key ("<key-2>") (not shown) on MIN-1 10 in block 100. Obviously the terms <key-2>, MIN-1 and SOF-1 are used for illustrative purposes and <key-2> can be any predefined function key on a mobile phone used to assign a set of features of another mobile phone to the current mobile phone. Alternatively, this process could be initiated by voice command activation, or upon a proper request by the user, by the customer service department of the mobile phone service provider rather than a function key. Once the user presses <key-2> 100, the mobile phone MIN-1 10 transmits an invoke <key-2> command to the serving MSC/VLR 16 in block 102. The serving MSC/VLR 16 receives the invoke <key-2> command and transmits the invoke <key-2> command to the HLR 18 in block 104. The HLR 18 receives the invoke <key-2> command from the MSC/VLR 16 and retrieves the group associated with MIN-1, Group A 20, in block 106.

The invention determines whether Group A 20 contains a MIN and SOF associated with the invoke <key-2> command in decision block 108. In other words, the invention determines whether MIN-1 and the MIN associated with <key-2>, MIN-2 are in the same group, Group A 20. If MIN-1 is not in the same group, Group A 20, as the MIN associated with <key-2>, MIN-2, as determined in decision block 108, the HLR 18 transmits a return error or reject to the serving MSC/VLR 16 in block 110. The serving MSC/VLR 16 receives the transmission and in turn transmits the return error or reject to the MIN-1 10 in block 112. The user is then notified that the invoke <key-2> command failed in block 114.

If MIN-1 is in the same group, Group A 20, as the MIN associated with <key-2>, MIN-2, as determined in decision block 108, the invention then determines whether a pass code is associated with <key-2> in Group A 20 in decision block 116. If a pass code is associated with the <key-2> found in Group A 20, the invention then determines whether a password was transmitted with the invoke <key-2> command in decision block 118. If a password was not transmitted with the invoke <key-2> command, the HLR 18 transmits a password request to the serving MSC/VLR 16 in block 120. The serving MSC/VLR 16 then transmits the password request to MIN-2 in block 122. The invention then prompts the user for the <key-2> password in block 124 and transmits the password entered by the user to the serving MSC/VLR 16 in block 126. The serving MSC/VLR 16 then transmits the password to the HLR 18 in block 128. When the HLR 18 receives the transmitted password from block 128 or the password was transmitted originally with the invoke <key-2> command as determined in decision block 118, the transmitted password is then checked to see whether it matches the pass code associated with <key-2> in decision block 130. If the transmitted password does not match the pass code associated with <key-2>, the HLR 18 transmits a return error or reject to the serving MSC/VLR 16 in block 132. The serving MSC/VLR 16 then transmits the return error or reject to MIN-1 10 in block 134 and notifies the user that the invoke <key-2> command failed in block 136.

If the transmitted password matches the pass code associated with <key-2>, as determined in decision block 130, or a pass code was not associated with <key-2> in Group A 20, as determined in decision block 116, the HLR 18 retrieves the set of features for the MIN associated with <key-2>, SOF-2, in block 138. The HLR 18 then associates the retrieved SOF, SOF-2, with MIN-1 in block 140 and transmits a return result, which contains the subscriber profile associated with the set of features for MIN-2, to the serving MSC/VLR 16 in block 142. The serving MSC/VLR 16 receives the transmission from the HLR 18 and transmits the return result to MIN-1 10 in block 144. The user is then notified that the invoke <key-2> command was successful and MIN-1 10 now is associated with the set of features assigned to <key-2>, SOF-2, in block 146. MIN-1 10 now emulates the set of features associated with MIN-2 12.

This procedure can be repeated multiple times by pressing any function key assigned to any of the mobile phones within the group. The user can redefine MIN-1 10 with SOF-1 simply by pressing the function key associated with MIN-1.

Although preferred embodiments of the invention have been described in detail, it will be understood by those skilled in the art that various modifications can be made therein without departing from the spirit and scope of the invention as set forth in the appended claims.

What is claimed is:

1. A method of enabling a telephone to emulate more than one subscriber profile in a telecommunications network, which comprises the step of:
    identifying a group of telephones and subscriber profiles, each of the telephones being associated with a subscriber profile in the group; and
    in response to a selection of a telephone in the group, associating the telephone with a subscriber profile associated with the selected telephone, such that the telephone emulates the associated subscriber profile.

2. The method as claimed in claim 1, wherein each subscriber profile contains a set of features.

3. The method as claimed in claim 1, wherein each subscriber profile in the group can be assigned a pass code.

4. The method as claimed in claim 1, wherein the group identification is stored in a home location register for the telephone.

5. The method as claimed in claim 1, wherein the telephone is a mobile telephone.

6. The method as claimed in claim 1, including the step of indicating whether or not the selected subscriber profile from the group was successfully associated with the telephone.

7. The method as claimed in claim 1, wherein:
    the group is stored in a home location register; and
    the telephone and the home location register are linked through a mobile switching center and a visiting location register.

8. The method as claimed in claim 1, wherein the step of associating the selected subscriber profile from the group with the telephone, such that the telephone emulates the selected subscriber profile, includes the steps of:
    determining whether the selected subscriber profile is in the group; and
    whenever the selected subscriber profile is in the group, associating the selected subscriber profile from the group with the telephone, such that the telephone emulates the selected subscriber profile.

9. The method as claimed in claim 1, wherein the selection of the subscriber profile is made by using at least one function key on the telephone.

10. The method as claimed in claim 1, wherein the selection of the subscriber profile is made by using at least one voice activated command.

11. The method as claimed in claim 1, wherein the selection of the subscriber profile is made by a customer service operator.

12. The method as claimed in claim 1, wherein the step of associating the selected subscriber profile from the group with the telephone, such that the telephone emulates the selected subscriber profile, includes the steps of:
    determining whether the selected subscriber profile is in the group; and
    whenever the selected subscriber profile is in the group, determining whether a pass code is associated with the selected subscriber profile in the group,
        whenever the pass code is not associated with the selected subscriber profile in the group, associating the selected subscriber profile from the group with the telephone, such that the telephone emulates the selected subscriber profile, and
        whenever the pass code is associated with the selected subscriber profile in the group,
            determining whether the pass code matches an entered password, and
            whenever the pass code matches the entered password, associating the selected subscriber profile from the group with the telephone, such that the telephone emulates the selected subscriber profile.

13. The method as claimed in claim 12, wherein the step of determining whether the pass code matches an entered password, includes the steps of:
    determining whether a password has been entered;
    whenever the password has not been entered, prompting the telephone for entry of the password; and
    whenever the password has been entered, determining whether the pass code matches the entered password.

14. The method according to claim 1, wherein any single subscriber profile of the group can be activated during said give time.

15. The method as claimed in claim 1, wherein the step of identifying the group includes the step of identifying the group from among a plurality of groups, each containing more than one subscriber profile.

16. A method of enabling a telephone to emulate more than one subscriber profile in a telecommunications network, which comprises the step of:
    identifying a group of telephones and subscriber profiles, each of the telephones being associated with a subscriber profile in the group; and
    in response to a selection of a telephone in the group, determining whether the selected telephone is in the group;
    whenever the selected telephone is in the group, associating the telephone with a subscriber profile associated with the selected telephone, such that the telephone emulates the associated subscriber profile, and
    indicating on the telephone that the associated subscriber profile from the group was successfully associated with the telephone; and
    whenever the selected telephone is not in the group, indicating on the telephone that the associated subscriber profile from the group was not successfully associated with the telephone.

17. The method as claimed in claim 16, wherein each subscriber profile contains a set of features.

18. The method as claimed in claim 16, wherein each subscriber profile in the group can be assigned a pass code.

19. The method as claimed in claim 16, wherein the group identification is stored in a home location register for the telephone.

20. The method as claimed in claim 16, wherein the telephone is a mobile telephone.

21. The method as claimed in claim 16, wherein the steps of associating the selected subscriber profile from the group with the telephone, such that the telephone emulates the selected subscriber profile, and indicating on the telephone that the selected subscriber profile from the group was successfully associated with the telephone, includes the steps of:

determining whether a pass code is associated with the selected subscriber profile in the group;
   whenever the pass code is associated with the selected subscriber profile in the group,
      determining whether the pass code matches an entered password,
      whenever the pass code does not match the entered password, indicating on the telephone that the selected subscriber profile from the group was not successfully associated with the telephone, and
      whenever the pass code matches the entered password, associating the selected subscriber profile from the group with the telephone, such that the telephone emulates the selected subscriber profile, and indicating on the telephone that the selected subscriber profile from the group was successfully associated with the telephone; and
   whenever the pass code is not associated with the selected subscriber profile,
      associating the selected subscriber profile from the group with the telephone, such that the telephone emulates the selected subscriber profile, and indicating on the telephone that the selected subscriber profile from the group was successfully associated with the telephone.

22. The method as claimed in claim 21, wherein the step of determining whether the pass code matches an entered password, includes the steps of:
   determining whether a password has been entered;
   whenever the password has not been entered, prompting the telephone for entry of the password; and
   whenever the password has been entered, determining whether the pass code matches the entered password.

23. The method as claimed in claim 16, wherein:
   the group is stored in a home location register; and
   the telephone and the home location register are linked through a mobile switching center and a visiting location register.

24. The method as claimed in claim 16, wherein the selection of the subscriber profile is made by using at least one function key on the telephone.

25. The method as claimed in claim 16, wherein the selection of the subscriber profile is made by using at least one voice activated command.

26. The method as claimed in claim 16, wherein the selection of the subscriber profile is made by a customer service operator.

27. The method as claimed in claim 16, wherein the step of identifying the group includes the step of identifying the group from among a plurality of groups, each containing more than one subscriber profile.

28. A system for enabling a telephone to emulate more than one subscriber profile in a telecommunications network, comprising:
   a home register comprising:
      means for identifying a group of telephones and subscriber profiles, each of the telephones being associated with a subscriber profile in the group,
      means for determining whether a selected telephone is in the group, and
      means for associating the telephone with a subscriber profile associated with the selected telephone, such that the telephone emulates the associated subscriber profile, and
   the telephone comprising:
      means for selecting another telephone, and
      means for indicating whether or not the associated subscriber profile from the group was successfully associated with the telephone.

29. The system as claimed in claim 28, wherein the telephone is a mobile telephone that is linked to the home location register through a mobile switching center and a visiting location register.

30. The system as claimed in claim 28, wherein each subscriber profile contains a set of features.

31. The system as claimed in claim 28, wherein the subscriber profile selection means uses at least one function key on the telephone.

32. The system as claimed in claim 28, wherein the subscriber profile selection means uses at least one voice activated command.

33. The method as claimed in claim 28, wherein the home location register further comprises means for allowing a customer service operator to select the subscriber profile.

34. The method as claimed in claim 28, wherein the home location register further comprises means for preventing the selected subscriber profile from being associated with the telephone when a password is incorrectly entered.

35. The method as claimed in claim 28, wherein the home location register further comprises means for prompting the telephone for a password.

36. The system as claimed in claim 28, wherein the means for identifying the group includes means for identifying the group from among a plurality of groups, each containing more than one subscriber profile.

37. A method of enabling a group of telephones to emulate at least one subscriber profile in a telecommunications network, which comprises the steps of:
   identifying a telephone group of telephones and telephone profiles, each of the telephones being associated with a telephone profile in the group;
   in response to a selection of a first telephone in the telephone group from a second telephone, associating the second telephone with a subscriber profile associated with the first telephone, such that the second telephone is able to emulate the associated subscriber profile; and
   in response to a selection of a first telephone in the telephone group from a third telephone, associating the third telephone with the subscriber profile associated with the first telephone, such that the third telephone is able to emulate the associated subscriber profile.

38. The method of claim 37, further comprising activating the emulation of the subscriber profile for the first telephone.

39. The method of claim 38, wherein said activating is on a telephone by telephone basis.

40. The method of claim 38, further comprising activating the emulation of the subscriber profile for the second telephone.

41. A method for enabling a first telephone belonging to a group of telephones to emulate more than one subscriber profile in a telecommunications network, comprising:
   receiving a command from the first telephone, said command indicating a second telephone;
   determining whether the first telephone and the second telephone are in the same group;
   if the first telephone and the second telephone are in the same group, then associating the first telephone with a subscriber profile associated with the second telephone, such that the first telephone emulates the subscriber profile.

* * * * *